United States Patent
Rowlands

(10) Patent No.: US 6,697,918 B2
(45) Date of Patent: Feb. 24, 2004

(54) CACHE CONFIGURED TO READ EVICTED CACHE BLOCK RESPONSIVE TO TRANSMITTING BLOCK'S ADDRESS ON INTERFACE

(75) Inventor: Joseph B. Rowlands, Santa Clara, CA (US)

(73) Assignee: Broadcom Corporation, Irvine, CA (US)

(*) Notice: Subject to any disclaimer, the term of this patent is extended or adjusted under 35 U.S.C. 154(b) by 275 days.

(21) Appl. No.: 09/909,009

(22) Filed: Jul. 18, 2001

(65) Prior Publication Data

US 2003/0018856 A1 Jan. 23, 2003

(51) Int. Cl.$^7$ .............................................. G06F 13/00
(52) U.S. Cl. ........................ 711/133; 711/144; 711/159
(58) Field of Search ............................. 711/133, 144, 711/159

(56) References Cited

U.S. PATENT DOCUMENTS

| | | | | |
|---|---|---|---|---|
| 5,860,117 A | * | 1/1999 | Cherabuddi | 711/151 |
| 5,883,826 A | * | 3/1999 | Wendell et al. | 365/63 |
| 6,038,645 A | | 3/2000 | Nanda et al. | 711/141 |
| 6,047,357 A | * | 4/2000 | Bannon et al. | 711/133 |
| 6,240,487 B1 | * | 5/2001 | Liu et al. | 711/127 |
| 6,393,529 B1 | * | 5/2002 | Keller | 711/141 |
| 2002/0147889 A1 | * | 10/2002 | Kruckemyer et al. | 711/144 |
| 2003/0023814 A1 | * | 1/2003 | Barroso et al. | 711/122 |

OTHER PUBLICATIONS

SiByte, "Target Applications," http://sibyte.com/mercurian/applications.htm, Jan. 15, 2001, 2 pages.

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB–1 CPU, Oct. 2000, rev. 0.1, 1 page.

SiByte, "Fact Sheet," SB–1250, Oct. 2000, rev. 0.2, 10 pages.

Stepanian, SiByte, SiByte SB–1 MIPS64 CPU Core, Embedded Processor Forum 2000, June 13, 2000, 15 pages.

Jim Keller, "The Mercurian Processor: A High Performance, Power–Efficient CMP for Networking," Oct. 10, 2000, 22 pages.

Tom R. Halfhill, "SiByte Reveals 64–Bit Core For NPUs; Independent MIPS64 Design Combines Low Power, High Performances," Microdesign Resources, Jun. 2000, Microprocessor Report, 4 pages.

Patterson and Hennessy, "Computer Architecture A Quantitative Approach," Second Edition, Morgan Kaufmann Publishers, Inc., 1990/1996, pp. 375–378.

\* cited by examiner

*Primary Examiner*—Reba I. Elmore
(74) *Attorney, Agent, or Firm*—Lawrence J. Merkel

(57) ABSTRACT

A cache is configured to select a cache block for eviction in response to detecting a cache miss. The cache transmits the address of the cache block as a write transaction on an interface to the cache, and the cache captures the address from the interface and reads the cache block from the cache memory in response to the address. The read may occur similar to other reads in the cache, detecting a hit in the cache (in the cache storage location from which the cache block is being evicted). The write transaction is initiated before the corresponding data is available for transfer, and the use of the bus bandwidth to initiate the transaction provides an open access time into the cache for reading the evicted cache block.

37 Claims, 5 Drawing Sheets

CACHE CONFIGURED TO READ EVICTED CACHE BLOCK RESPONSIVE TO TRANSMITTING BLOCK'S ADDRESS ON INTERFACE

BACKGROUND OF THE INVENTION

1. Field of the Invention

This invention is related to caches and, more particularly, to evicting blocks of data from caches.

2. Description of the Related Art

Generally, caches are used to reduce the effective latency of memory accesses. A cache is a memory into which copies of data from an underlying memory are stored. Generally, a block of contiguous data is allocated/deallocated from the cache as a unit (i.e. a cache block is the smallest unit of allocation/deallocation of storage space in the cache). The term cache line is also frequently used as a synonym for cache block. The cache typically has a latency less than that of the underlying memory, and thus accesses for which the corresponding data is stored in the cache may occur with a lower latency than accesses to the underlying memory. Thus, the average latency of memory accesses may be less than the latency of the underlying memory.

Caches attempt to store the most recently accessed blocks and/or the most frequently accessed blocks. In some cases, prefetch strategies are employed to speculatively load blocks which may be accessed in the future into the cache. However, since caches are usually significantly smaller in capacity than the underlying memory, data for an access may not be stored in the cache when the access occurs (referred to as a cache miss, or simply a miss). When a cache miss occurs, the missing cache block is generally loaded into the cache. Since the cache has a finite capacity, in many cases a valid cache block in the cache is replaced by the newly loaded cache block. If the cache block being replaced (referred to as the evicted cache block or the victim cache block) is modified with respect to the copy stored in memory, the evicted cache block is read from the memory before replacement by the newly loaded cache block. The evicted cache block may then be written back to memory.

Unfortunately, the hardware for reading the evicted cache block from the cache for writing back to memory may impact the amount of time for performing accesses. Typically, such hardware must be integrated into the hardware for performing cache accesses. Since cache accesses are often the critical timing path in a semiconductor device, increasing the path length may negatively impact the overall operating frequency of the device. Alternatively, the critical path may have to be pipelined, which may reduce the performance of the device.

SUMMARY OF THE INVENTION

A cache is configured to select a cache block for eviction in response to detecting a cache miss. The cache transmits the address of the cache block as a write transaction on an interface to the cache, and the cache captures the address from the interface and reads the cache block from the cache memory in response to the address. The read may occur similar to other reads in the cache, detecting a hit in the cache (in the cache storage location from which the cache block is being evicted). In this manner, the eviction may be provided for without additional hardware (e.g. an added port, or another path to the same port) for supporting the eviction. Thus, the timing of the path may not be impacted to perform evictions. The path through the cache for accesses from other agents and for evictions may be the same.

Using the initiating of the write transaction to write the evicted cache block to memory to read the evicted cache block from the cache may be viewed as effectively creating a break in the requests to the cache for reading the evicted cache block from the cache. The write transaction is initiated before the corresponding data is available for transfer, and the use of the bus bandwidth to initiate the transaction provides an open access time into the cache for reading the evicted cache block. Viewed in another way, the access to the cache to read the evicted cache block may be effectively free, reusing the hardware already used to perform cache accesses for transactions initiated by other agents.

Broadly speaking, an apparatus is contemplated comprising an interface and cache coupled thereto. The cache is configured to transmit an address of a cache block to be evicted from the cache on the interface. The cache includes a memory configured to store a plurality of cache blocks including the cache block, and the memory is coupled to receive the address from the interface. The memory is configured to access the cache block in response to the address for transmission on the interface.

Additionally, a cache is contemplated comprising a memory configured to store a plurality of cache blocks and a control circuit. The control circuit is configured to transmit an address of a cache block to be evicted from the cache on an interface to which the cache is couplable. The memory is coupled to receive the address from the interface and is configured to access the cache block in response to the address for transmission on the interface.

Moreover, a method is contemplated. A cache transmits an address of a cache block to be evicted from the cache on an interface. In response to the transmitting, the cache block is read from a data memory of the cache for transmission on the interface.

BRIEF DESCRIPTION OF THE DRAWINGS

The following detailed description makes reference to the accompanying drawings, which are now briefly described.

Figure 1:
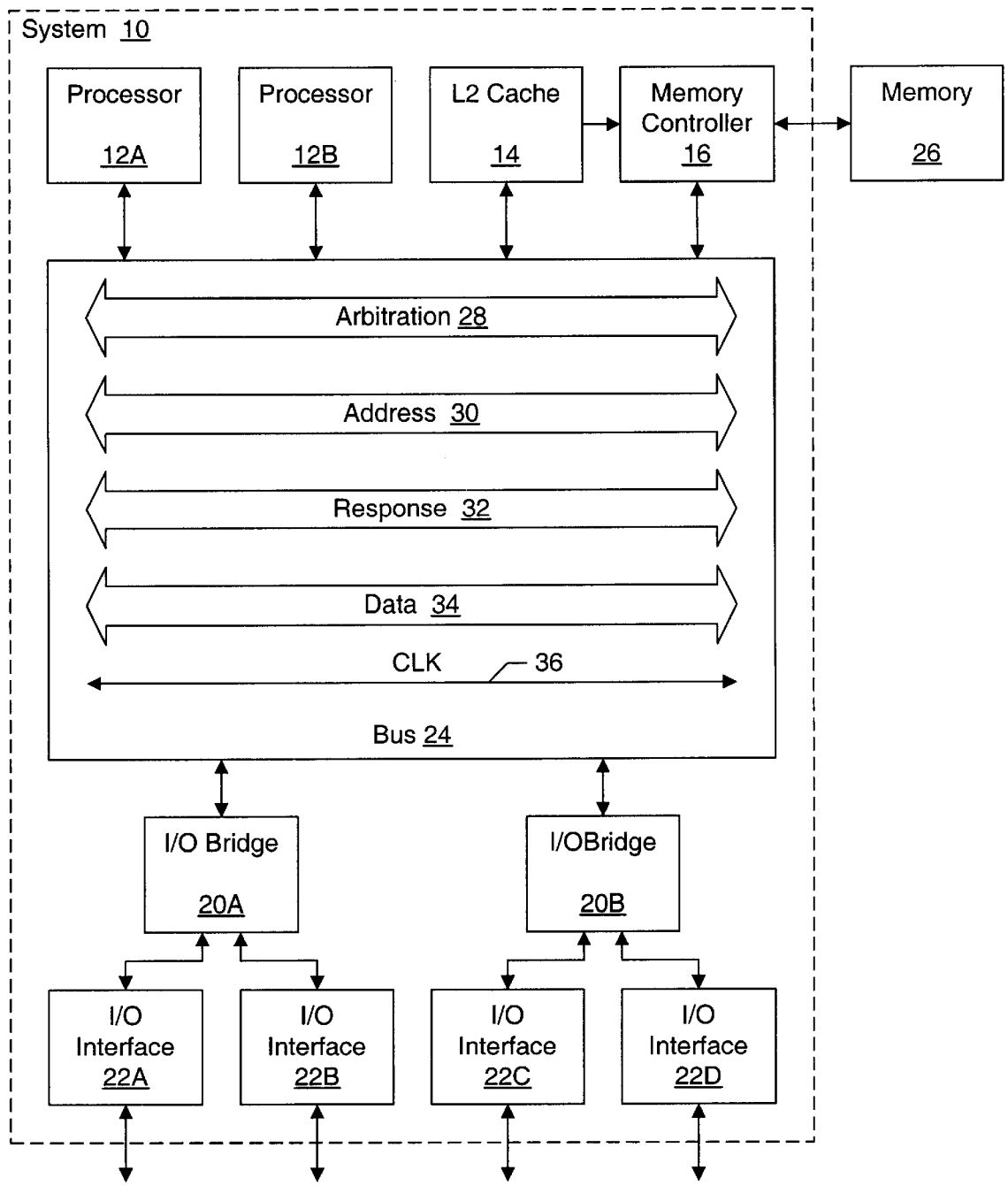
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Overview

Turning now to FIG. 1, a block diagram of one embodiment of a system 10 is shown. Other embodiments are possible and contemplated. In the embodiment of FIG. 1, the system 10 includes processors 12A–12B, an L2 cache 14, a memory controller 16, a pair of input/output (I/O) bridges 20A–20B, and 10 interfaces 22A–22D. The system 10 may include a bus 24 for interconnecting the various components of the system 10. More particularly, as illustrated in FIG. 1, the bus 24 may include arbitration lines 28, an address bus 30, response lines 32, a data bus 34, and a clock line or lines 36. As illustrated in FIG. 1, each of the processors 12A–12B, the L2 cache 14, the memory controller 16, and the I/O bridges 20A–20B are coupled to bus 24. Thus, each of the processors 12A–12B, the L2 cache 14, the memory controller 16, and the I/O bridges 20A–20B may be an agent on the bus 24 for the illustrated embodiment. More particularly, each agent may be coupled to the clock line(s) 36 and to the conductors within the bus 24 that carry signals which that agent may sample and/or drive. The I/O bridge 20A is coupled to the I/O interfaces 22A–22B, and the I/O bridge 20B is coupled to the I/O interfaces 22C–22D. The L2 cache 14 is coupled to the memory controller 16, which is further coupled to a memory 26.

The bus 24 may be a split transaction bus in the illustrated embodiment. A split transaction bus splits the address and data portions of each transaction and allows the address portion (referred to as the address phase) and the data portion (referred to as the data phase) to proceed independently. In the illustrated embodiment, the address bus 30 and the data bus 34 are independently arbitrated for (using signals on the arbitration lines 28). Each transaction including both address and data thus includes an arbitration for the address bus 30, an address phase on the address bus 30, an arbitration for the data bus 34, and a data phase on the data bus 34. Additionally, coherent transactions may include a response phase on the response lines 32 for communicating coherency information after the address phase. The bus clock signal CLK on clock line(s) 36 defines the clock cycle for the bus 24.

The bus 24 may be pipelined. The bus 24 may employ any suitable signalling technique. For example, in one embodiment, differential signalling may be used for high speed signal transmission. Other embodiments may employ any other signalling technique (e.g. TTL, CMOS, GTL, HSTL, etc.).

The processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

The L2 cache 14 is a high speed cache memory. The L2 cache 14 is referred to as "L2" since the processors 12A–12B may employ internal level 1 ("L1") caches. If L1 caches are not included in the processors 12A–12B, the L2 cache 14 may be an L1 cache. Furthermore, if multiple levels of caching are included in the processors 12A–12B, L2 cache 14 may be an outer level cache than L2. The L2 cache 14 may employ any organization, including direct mapped, set associative, and fully associative organizations. In one particular implementation, the L2 cache 14 may be a 512 kilobyte, 4 way set associative cache having 32 byte blocks. A set associative cache is a cache arranged into multiple sets, each set comprising two or more cache storage locations. A portion of the address (the "index") is used to select one of the sets (i.e. each encoding of the index selects a different set). The cache storage locations in the selected set are eligible to store the cache block addressed by the address. Each of the entries within the set is referred to as a "way" of the set. The portion of the address remaining after removing the index (and the offset within the cache block) is referred to as the "tag", and is stored in each cache storage location to identify the cache block in that cache storage location. The stored tags are compared to the corresponding tag portion of the address of a memory transaction to determine if the memory transaction hits or misses in the cache, and is used to select the way in which the hit is detected (if a hit is detected).

The memory controller 16 is configured to access the memory 26 in response to memory transactions received on the bus 24. The memory controller 16 receives a hit signal from the L2 cache 14, and if a hit is detected in the L2 cache 14 for a memory transaction, the memory controller 16 does not respond to that memory transaction. If a miss is detected by the L2 cache 14, or the memory transaction is non-cacheable, the memory controller 16 may access the memory 26 to perform the read or write operation. The memory controller 16 may be designed to access any of a variety of types of memory. For example, the memory controller 16 may be designed for synchronous dynamic random access memory (SDRAM), and more particularly double data rate (DDR) SDRAM. Alternatively, the memory controller 16 may be designed for DRAM, Rambus DRAM (RDRAM), SRAM, or any other suitable memory device.

The I/O bridges 20A–20B link one or more I/O interfaces (e.g. the I/O interfaces 22A–22B for the I/O bridge 20A and the I/O interfaces 22C–22D for the I/O bridge 20B) to the bus 24. The I/O bridges 20A–20B may serve to reduce the electrical loading on the bus 24 if more than one I/O interface 22A–22B is bridged by that I/O bridge. Generally, the I/O bridge 20A performs transactions on the bus 24 on behalf of the I/O interfaces 22A–22B and relays transactions targeted at an I/O interface 22A–22B from the bus 24 to that I/O interface 22A–22B. Similarly, the I/O bridge 20B generally performs transactions on the bus 24 on behalf of the I/O interfaces 22C–22D and relays transactions targeted at an I/O interface 22C–22D from the bus 24 to that I/O interface 22C–22D. In one implementation, the I/O bridge 20A may be a bridge to a PCI interface (e.g. the I/O interface 22A) and to a Lightning Data Transport (LDT) I/O fabric developed by Advanced Micro Devices, Inc. (e.g. the I/O interface 22B). Other I/O interfaces may be bridged by the I/O bridge 20B. Other implementations may bridge any combination of I/O interfaces using any combination of I/O bridges. The I/O interfaces 22A–22D may include one or more serial interfaces, Personal Computer Memory Card International Association (PCMCIA) interfaces, Ethernet interfaces (e.g. media access control level interfaces), Peripheral Component Interconnect (PCI) interfaces, LDT interfaces, etc.

It is noted that the system 10 (and more particularly the processors 12A–12B, the L2 cache 14, the memory controller 16, the I/O interfaces 22A–22D, the I/O bridges 20A–20B and the bus 24) may be integrated onto a single integrated circuit as a system on a chip configuration. In another configuration, the memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice.

It is noted that, while FIG. 1 illustrates the I/O interfaces 22A–22D coupled through the I/O bridges 20A–20B to the bus 24, other embodiments may include one or more I/O interfaces directly coupled to the bus 24, if desired. Furthermore, embodiments in which one processor 12A or more than two processors are included are contemplated.

Cache

Figure 2:
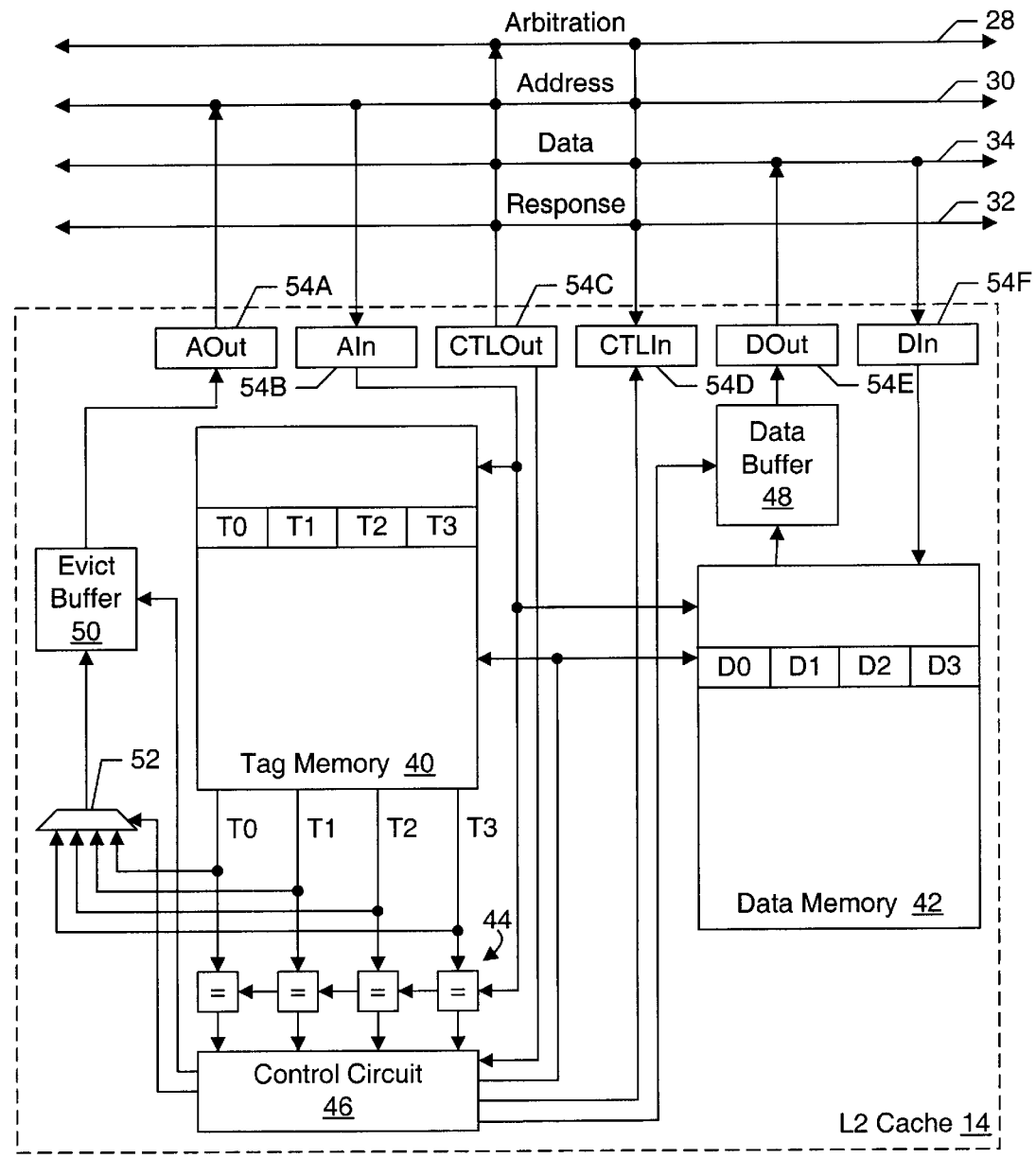
FIG. 2 is a block diagram of one embodiment of a cache shown in FIG. 1.

Turning now to FIG. 2, a block diagram of one embodiment of the L2 cache 14 is shown. Other embodiments are possible and contemplated. In the embodiment of FIG. 2, the L2 cache 14 includes a tag memory 40, a data memory 42, a set of comparators 44, a control circuit 46, a data buffer 48, an evict buffer 50, a multiplexor (mux) 52, and input/output circuits 54A–54F. Also illustrated in FIG. 2 is a portion of the bus 24 as shown in FIG. 1. Particularly, the arbitration lines 28, the address bus 30, the response lines 32, and the data bus 34 are shown. The tag memory 40, the data memory 42, and the comparators 44 are each coupled to the address in (AIn) circuit 54B. The data memory 32 is coupled to the data in (DIn) circuit 54F and the data buffer 48, which is further coupled to the control circuit 46 and the data out (DOut) circuit 54E. The control circuit 46 is coupled to the tag memory 40 and the data memory 42, and is further coupled to the control in (CTLIn) and control out (CTLOut) circuits 54C and 54D. Additionally, the control circuit is coupled to the comparators 44, the evict buffer 50, and the mux 52. Each of the comparators 44 is further coupled to the tag memory 40, which is further coupled to the mux 52. The mux 52 is coupled to the evict buffer 50, which is further coupled to the address out (AOut) circuit 54A. The AOut circuit 54A and the AIn circuit 54B are coupled to the address portion of the address bus 30. The CTLOut and CTLIn circuits 54C and 54D are coupled to the control signal portions of the address bus 28 and the data bus 34, as well as to the arbitration lines 28 and the response lines 32. The DOut and DIn interfaces are coupled to the data portion of the data bus 34.

Generally, the tag memory 40 stores the tag information for each cache storage location in the L2 cache 14, and the data memory 42 stores the cache block of data for each cache storage location in the L2 cache 14. Thus, a cache storage location comprises a tag memory storage location and a data memory storage location in this embodiment. For example, a set of four tags T0–T3 are illustrated in the tag memory 40 in FIG. 2, and a corresponding set of four cache blocks D0–D3 are illustrated in the data memory 42 in FIG. 2. Other embodiments may have more or fewer ways in a set, as desired. The tag memory storage location stores the tag for the cache storage location (and possibly other information, such as validity and dirty information). For example, in one implementation, the tag information for a cache storage location includes the tag portion of the address, a valid bit indicating the validity or lack of validity of the cache storage location, and a dirty bit indicating the dirty or clean state of the cache block. A cache block is dirty if at least one byte of the cache block has been modified and the modification has not been written to the memory 26. The data memory storage location stores the cache block of data in the cache storage location.

The index portion of the address of a transaction is provided to the tag memory 40 and the data memory 42. Each memory selects a set of storage locations in response to the index. The tag memory 40 outputs the tag from each selected storage location to the comparators 44 (e.g. T0–T3 in FIG. 2), which compare the tags to the tag portion of the address. If the tag compares equally, and the cache storage location is valid, the corresponding comparator 44 may signal a hit to the control circuit 46 (or the control circuit 46 may qualify the signals from the comparators 44 with whether or not the corresponding cache storage locations are valid). The control circuit 46 may assert the hit signal (not shown in FIG. 2) to the memory controller 16 if any of the comparators 44 indicates a hit, and may determine a way selection from the output of comparators 44 as well. Each comparator 44 is comparing the tag from a different way of the L2 cache 14, and thus the comparator output indicating a hit is an indication of the hitting way. The control circuit 46 provides the way selection to the tag memory 40 and the data memory 42.

The data memory 42 provides data from the storage location at the selected index and way, or receives data into that storage location, depending upon whether the transaction is a read transaction or a write transaction. The control circuit 46 receives the control information corresponding to the transaction (e.g. through the CTLIn circuit 54D), and generates control signals for the data memory 42 and the tag memory 40. The control signals may include, for example, an enable signal and a read/write signal to indicate whether the memory is to read or write. If the data is being provided from the data memory 42 (e.g. for a read transaction or for an evicted cache block, as described in more detail below), the data may be queued in the data buffer 48 for transmission on the bus 24 during the data phase of the transaction.

The tag memory 40 may be updated in response to the transaction as well. For example, if the transaction is a write, the dirty bit in the hitting entry may be updated. It is noted that tag updates may not occur in the same clock cycle that the L2 cache 14 is accessed to determine the hit/miss of the input address, in some embodiments.

If the transaction is a miss in the L2 cache 14 and is cacheable, the control circuit 46 may select a way for eviction to receive a line fill of the missing cache block. Any replacement scheme may be used to select the way (e.g. least recently used (LRU), random selection, etc.). If the cache block stored in the selected way is dirty, then the cache block is written to the memory 26 to record the update. In this case, the tags output from the tag memory 40 are supplied to the mux 52, and the control circuit 46 provides selection control signals to the mux 52 to select the tag corresponding to the selected way. The selected tag (plus the index portion of the address) is stored in the evict buffer 50. The corresponding cache block may remain stored in the data memory 42 at this time.

The evict buffer 50 comprises one or more entries for storing addresses of cache blocks selected for eviction. If one or more addresses are stored in the evict buffer 50, the control circuit 46 may arbitrate (using the arbitration lines 28) for the address bus 30. Once the address bus 30 is granted to the L2 cache 14, the control circuit 46 may cause the address from the evict buffer 50 to be driven on the address bus 30 as a write transaction (e.g. through the AOut circuit 54A and CTLOut circuit 54C).

The L2 cache 14, like other agents on the bus 24, may sample the addresses driven during the address phases of transactions. Similarly, when the L2 cache 14 drives the address of the cache block selected for eviction, the L2 cache 14 may sample the address (e.g. in the AIn circuit 54B). The index portion of the address is provided to the tag memory 40 and the data memory 42 using the same input path that is used for other transactions. The comparators 44 compare the tag portion of the address to the tags from the tag memory 40 and detect a hit in the way selected for eviction. The control circuit 46 detects that the write transaction is writing the evicted cache block to memory, and treats the transaction as a read (e.g. the control signals provided by the control circuit 46 to the data memory 42 and the tag memory 40 may indicate that the operation is a read). Accordingly, the data memory 42 outputs the evicted cache block. The evicted cache block may be stored in the data buffer 48 until the data phase of the write transaction occurs, and then the data may be transferred on the data bus 34.

The data buffer 48 may comprise one or more entries, each entry configured to store a cache block. The data buffer 48 may be used to store evicted cache blocks read from the data memory 42 until the data phase of the corresponding write transaction. The data buffer may also be used to store cache blocks corresponding to read transactions which hit in the L2 cache 14, again until the data phase of the corresponding read transaction.

The tag of the evicted cache block is invalidated as well, to indicate that the evicted cache block is no longer stored in the L2 cache 14. The invalidation may occur in a variety of ways. For example, in one embodiment, the tag is overwritten with the tag corresponding to the missing cache block when the fill occurs. In other embodiments, the tag could be invalidated during the read of the evicted cache block from the data memory 42.

Since the evicted cache block is read from the data memory 42 in response to a transaction on the bus 24 (specifically, the write transaction to transfer the data to memory), the reading of the evicted cache block may not impact the timing of the path through the cache for cache accesses. The same path used to access the cache (e.g. for read and write transactions initiated by other agents) may be used to access the cache for reading the evicted cache block.

Using the initiating of the write transaction to write the evicted cache block to memory to read the evicted cache block from the data memory 42 may be viewed as effectively creating a break in the requests to the L2 cache 14 for reading the evicted cache block from the data memory 42. The write transaction is initiated before the corresponding data is available for transfer, and the use of the bus bandwidth to initiate the transaction provides an open access time into the L2 cache 14 for reading the evicted cache block. Viewed in another way, the access to the cache to read the evicted cache block may be effectively free, reusing the hardware already used to perform cache accesses for transactions initiated by other agents. A small amount of circuitry in control circuit 46 may be used to read the cache block during the write transaction.

It is noted that, since reading the evicted cache block from the data memory 42 is delayed from selection of the cache block for eviction, a mechanism may be employed to ensure that the evicted cache block is not overwritten prior to reading evicted cache block. For example, the L2 cache 14 may be given priority arbitration on the bus 24 to perform eviction write transactions, thus ensuring that the block is read shortly after being selected. Alternatively, a data buffer similar to data buffer 48 may be provided to buffer input (fill) data until the underlying evicted cache block has been read.

The I/O circuits 54A–54F illustrated in FIG. 2 may generally be used to handle input/output of the L2 cache 14 with regard to the bus 24. Specifically, each of the output circuits 54A, 54C, and 54E may include circuitry for properly driving signals on the bus 24. For example, the output circuits may include driver circuits for driving the signal lines. Furthermore, in one embodiment, the bus 24 may use differential signalling. The output circuits 54A, 54C, and 54E may convert the non-differential internal data of the L2 cache 14 into differential signalling on the bus 24. The output circuits 54A, 54C, and 54E may be controlled by control circuit 46 to output signals at appropriate times (e.g. via enable signals, not shown). Similarly, the input circuits 54B, 54D, and 54F may include clocked storage devices (register, flops, latches, etc.) for sampling the bus 24. The input circuits may also convert the differential signalling to non-differential internal data. It is noted that the circuits 54A–54F may be optional, depending on the internal organization of the L2 cache 14, the protocol and signalling of the bus 24, etc. Alternatively, the circuitry may be integrated into other parts of the L2 cache 14.

It is noted that, while the tags memory 40 and the data memory 42 are illustrated separately in FIG. 2, these memories may be integrated if desired. Generally, the tags memory 40 and the data memory 42 may form a memory for storing tags and corresponding cache blocks, whether the memory is divided into portions as illustrated or is a single integrated memory. As used herein, a cache storage location is a storage location for storing one cache block and associated tag information.

It is noted that, while the embodiment described above is a set associative embodiment, other embodiments may employ any organization, as desired. Depending on the organization, one or more cache storage locations of the cache may be eligible to store a cache block. A cache storage location is eligible to store a cache block if the cache storage location is searched by the cache when the address of the cache block is presented to the cache. For example, in a set associative embodiment, the cache storage locations included in the set indexed by the address are eligible to store the cache block. In a direct-mapped embodiment, the one cache block indexed by the address is eligible to store the cache block. In a fully associative embodiment, each cache storage location is eligible to store the cache block.

It is noted that the L2 cache 14 may monitor and/or provide response information on the response lines 32 in various embodiments. For example, in one embodiment, a response from an agent may indicate that the agent will provide the data for the transaction. The L2 cache 14 may detect such a response and cancel providing data for the transaction if the transaction is a hit. Transactions which are a miss and which receive the response may be cancelled (and the replacement of the evicted cache block may be cancelled) or may continue, as desired.

While the above description has referred to an embodiment coupled to a bus, generally, various embodiments may be coupled to an interface. Generally, an interface is a mechanism for communication between devices. A bus may be an example of an interface. Additionally, interfaces may be packet-based interfaces. Furthermore, caches having interfaces directly to other circuitry (e.g. L1 caches inside the processors 12A–12B) may employ the above described features. A transaction is a communication on the interface. The transaction may include an address transfer and optionally a data transfer. Transactions may be read transactions (transfers of data from a responder to the requestor) and write transactions (transfers of data from the requestor to the responder). Transactions may further include various coherency commands which may or may not involve a transfer of data.

It is noted that the term eviction is used herein to refer to the removing of a cache block from the cache. The term replacement may also be used synonymously with the term eviction.

Figure 3:
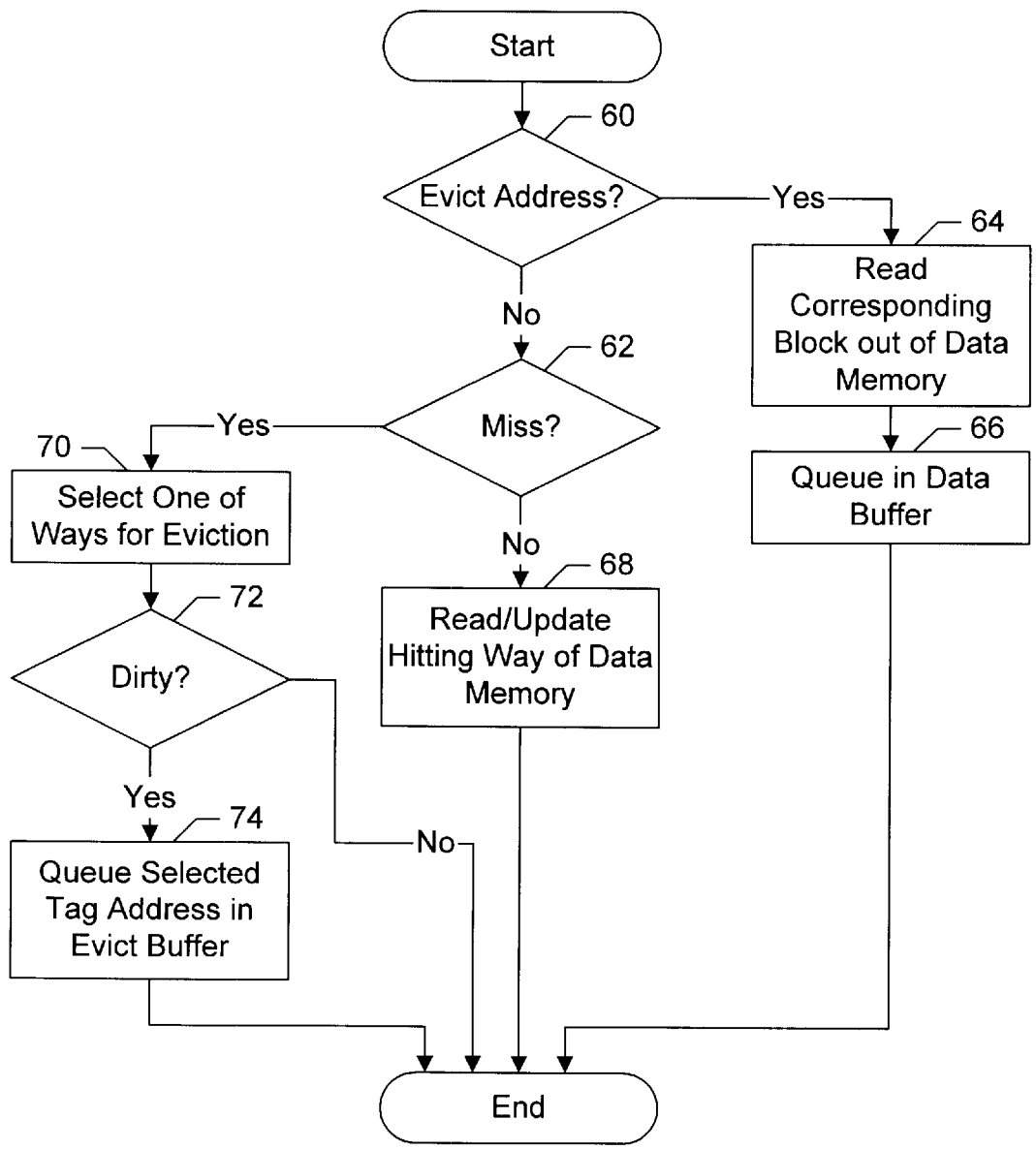
FIG. 3 is a flowchart illustrating operation of one embodiment of a control circuit shown in FIG. 2.

Turning next to FIG. 3, a flowchart is shown illustrating the operation of one embodiment of the L2 cache 14 (more specifically, the control circuit 46 for the embodiment shown in FIG. 2) in response to sampling an address from the address bus 30. Other embodiments are possible and contemplated. While the blocks shown in FIG. 3 are illustrated in a particular order for ease of understanding, any order may be used. Furthermore, blocks may be performed in parallel by the combinatorial logic circuitry within the L2 cache 14 (e.g. decision blocks 60 and 62 are independent and may be performed in parallel). Still further, blocks may be performed in different clock cycles or the same clock cycle, as desired.

The L2 cache 14 determines if the sampled address is an address driven by the L2 cache 14 for an eviction write to memory (decision block 60). The L2 cache 14 may make the determination in any desired way. For example, circuitry within the L2 cache 14 may be in a state indicating that the address was driven by the L2 cache 14 (e.g. circuitry responsible for driving the address may be in a particular state). In one embodiment, a tag is driven with the address (to be used to match the address phase with the data phase). The tag includes a portion indicating the source of the transaction. The L2 cache 14 could examine the sampled tag and detect that the tag indicates that the L2 cache 14 is the source. In yet another alternative, the encoding of the transaction on the bus 24 could indicate that it is a write corresponding to an L2 cache eviction. If the sampled address is an address corresponding to an eviction, the L2 cache 14 may treat the sampled address as a read. More particularly, the L2 cache 14 may read the corresponding cache block out of the data memory 42 and queue the block in the data buffer 48 (blocks 64 and 66).

L2 cache 14 also determines if the sampled address is a miss in the L2 cache 14 (decision block 62). If the sampled address is a hit, the L2 cache 14 may read the data from the hitting way of the data memory 42 (for a read) or update the hitting way with the data (for a write) (block 68). It is noted that the data for a write may not be available for update when the address is presented on the bus 24. Accordingly, the update of the hitting way of the data memory 42 may be delayed with respect to the check for a hit. In one embodiment, for example, the L2 cache 14 may include a request queue in which addresses are queued. Writes may remain queued (with information indicating the hitting way) until the data is provided, and then the data may be written to the hitting way. Alternatively, a receiving data buffer may be provided and an entry in the receiving data buffer may be allocated in response to the write. The information indicating the hitting way and the index may be stored in the allocated entry.

If the sampled address is a miss in the L2 cache 14, the L2 cache 14 may select one of the ways for eviction (block 70). If the cache block in the selected way is dirty (i.e. modified with respect to the copy stored in the memory 26—decision block 72), the L2 cache 14 may queue the address from the selected way in the evict buffer 50 (block 74). If the cache block is not dirty, then a write of the evicted cache block is not needed and the evicted cache block may be overwritten by the fill data. It is noted that, in the case of a miss, one embodiment may retain the transactions in a queue with information indicating the way selected for replacement until the data corresponding to the missing transaction is captured for writing into the data memory 42. Alternatively, a receiving data buffer may be used as described above, with the information indicating the way selected for replacement being stored instead of the hitting way.

It is noted that, in addition to the operation described above with regard to FIG. 3, the L2 cache 14 may generally have other operation with regard to sampled addresses. Furthermore, the L2 cache 14 may be configured to arbitrate for the address bus if an address is stored in the evict buffer 50, and may be configured to arbitrate for the data bus to transfer the evicted cache block to the memory 26. Furthermore, the L2 cache 14 may transfer data for a read transaction that hits in the L2 cache 14.

Figure 4:
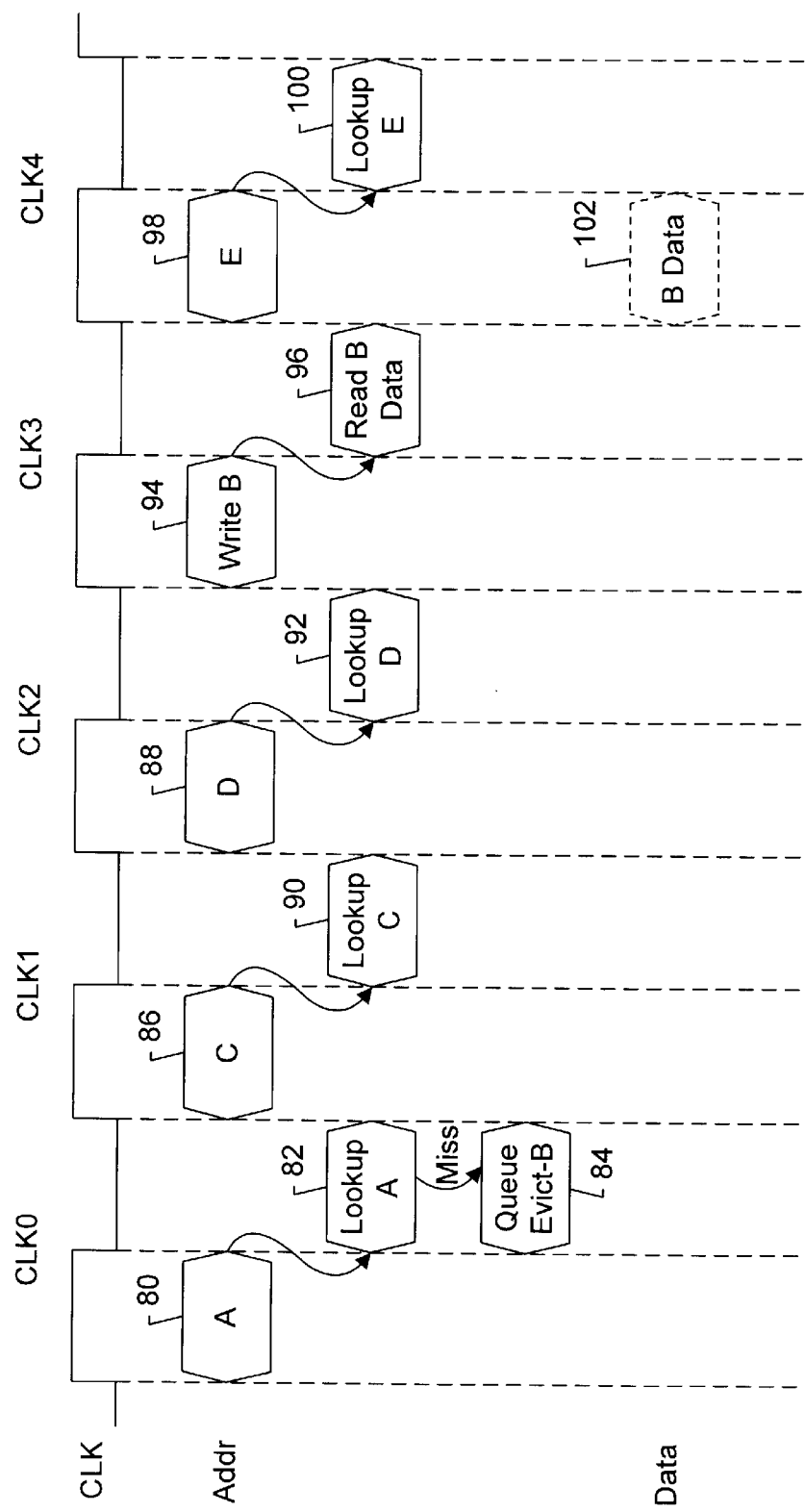
FIG. 4 is a timing diagram illustrating operation of one embodiment of the cache shown in FIG. 2 for a set of exemplary transactions.

Turning now to FIG. 4, a timing diagram illustrating operation of the L2 cache 14 for a set of exemplary transactions is shown. In the example of FIG. 4, several clock cycles of the clock signal CLK corresponding to the bus 24 is shown. Each clock cycle is labeled (CLK0, CLK1, CLK2, CLK3, and CLK4). Vertical lines delimit the high and low phases of each clock cycle. Address phases are illustrated horizontally across from the "Addr" label, and certain internal operations of the L2 cache 14 are illustrated below and linked by arrows to the address phase that generates the internal operation. Additionally, a data phase is illustrated horizontally across from the "Data" label.

For the example of FIG. 4, signals on the bus 24 are driven responsive to the rising edge of the clock signal CLK and sampled responsive to the falling edge of the clock signal CLK. Other embodiments may reverse the edges used for driving and sampling, or may sample and drive responsive to the same edge of the clock signal CLK. The bus may be precharged during the time period between the falling edge and the next rising edge.

In clock cycle CLK0, an agent initiates a transaction to address A (reference numeral 80). The L2 cache 14 samples the address A responsive to the falling edge of the clock signal CLK. During the low phase of clock cycle CLK0, the L2 cache 14 looks up the address A (reference numeral 82). The L2 cache 14 detects a miss for the address A, and thus selects a way for eviction. The cache block in the selected way is dirty in this example, and thus a write transaction to transfer the evicted cache block back to the memory 26 is to be performed by the L2 cache 14. An address B corresponding to the evicted cache block is queued in the evict buffer 50 (reference numeral 84). It is noted that the queuing of the address B may extend into the high phase of the next clock cycle, if desired. The L2 cache 14 begins arbitrating for the bus 24 to perform the write transaction for the eviction.

During clock cycles CLK1 and CLK2, agents initiate transactions to addresses C and D, respectively (reference numerals 86 and 88). In response to each transaction, the L2 cache 14 looks up the addresses (and detects hits in this example—reference numerals 90 and 92).

The L2 cache 14 wins arbitration for the bus 24. In response, the L2 cache 14 transmits the address B as a write transaction on the address bus 30 (reference numeral 94) during clock cycle CLK3. Thus, bandwidth in the L2 cache has been freed to read the evicted cache block from the data memory 42. During the time that a lookup occurs for other transactions, the L2 cache 14 reads the evicted cache block corresponding to address B (reference numeral 96). Again, the read of the evicted cache block may be accomplished by treating the write transaction as a read in the L2 cache 14.

Finally, an additional transaction to address E and a corresponding lookup in the L2 cache for address E are shown in clock cycle CLK4 (reference numerals 98 and 100). Additionally, a data phase for the write transaction to address B is illustrated during clock cycle CLK4 (reference numeral 102). The data phase for the write transaction may occur in a later clock cycle as well, depending upon when the L2 cache 14 arbitrates for and wins arbitration for the data bus.

Figure 5:
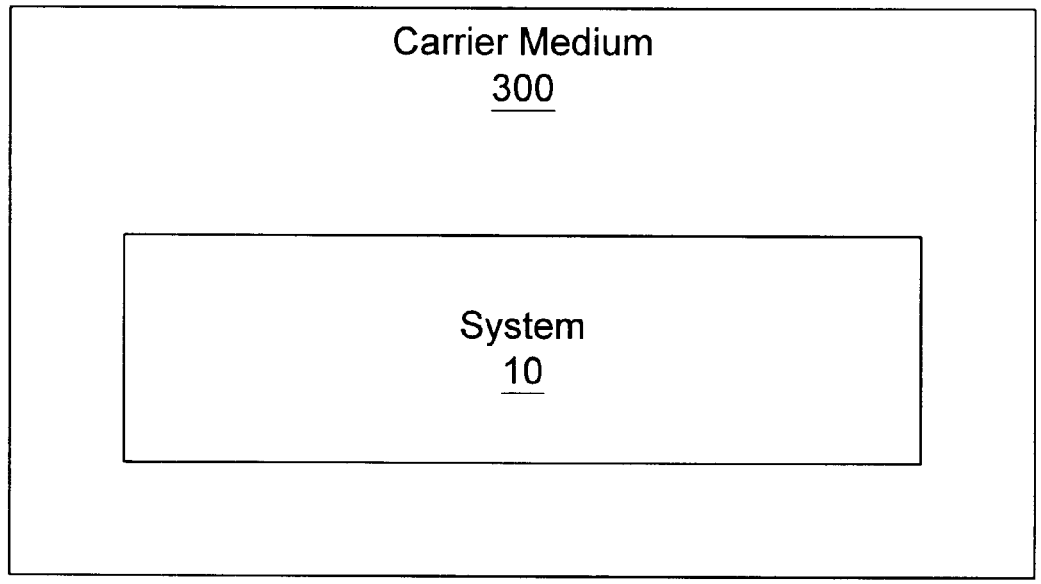
FIG. 5 is a block diagram of a carrier medium.

Turning next to FIG. 5, a block diagram of a carrier medium 300 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link. Generally, the database of system 10 carried on carrier medium 300 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 300 may be the netlist (with or without the synthesis library) or the data set, as desired.

While carrier medium 300 carries a representation of system 10, other embodiments may carry a representation of any portion of system 10, as desired, including any set of a cache (e.g. the L2 cache 14) or a portion thereof (e.g. one or more of a tag memory, data memory, control circuitry, evict buffer, data buffer, interface circuitry, etc.), bus 24, etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
    an interface; and
    a cache coupled to the interface, wherein the cache is configured to transmit an address of a first cache block to be evicted from the cache on the interface, and wherein the cache includes a cache memory configured to store a plurality of cache blocks including the first cache block, the plurality of cache blocks being a capacity of the cache, and wherein the cache memory is coupled to receive the address from the interface, and wherein the cache memory is configured to access the first cache block in response to the address for transmission on the interface.

2. The apparatus as recited in claim 1 wherein the cache is further configured to transmit the first cache block on the interface.

3. The apparatus as recited in claim 1 wherein the cache includes an input path, and wherein a read address received from the interface traverses the input path to access the cache, and wherein the same input path is traversed by the address to access the first cache block.

4. The apparatus as recited in claim 1 wherein the cache further comprises a tag memory coupled to receive a second address from the interface and configured to output a plurality of tags corresponding to cache storage locations in the cache memory that are eligible to store a second cache block addressed by the second address, wherein the cache is configured to select a first cache storage location of the cache storage locations to store the second cache block if the second address is a miss in the cache, and wherein the address of the cache block comprises a first tag of the plurality of tags, the first tag corresponding to the first cache storage location.

5. The apparatus as recited in claim 4 wherein the cache further comprises a plurality of comparators, each of the plurality of comparators coupled to receive a respective one of the plurality of tags and a tag portion of the second address, and wherein the plurality of comparators are configured to compare the plurality of tags to the tag portion of the second address to detect the miss.

6. The apparatus as recited in claim 1 wherein the cache further comprises a data buffer coupled to the memory, wherein the data buffer is configured to store the first cache block read from the memory for transmission on the interface.

7. The apparatus as recited in claim 1 wherein the interface is a bus.

8. The apparatus as recited in claim 1 wherein the cache transmits the address on the interface as a write transaction.

9. A cache comprising:
    a cache memory configured to store a plurality of cache blocks that is a capacity of the cache; and
    a control circuit configured to transmit an address of a cache block to be evicted from the cache on an interface to which the cache is couplable;
    wherein the cache memory is coupled to receive the address from the interface and is configured to access the cache block in response to the address for transmission on the interface.

10. The cache as recited in claim 9 wherein the control circuit is configured to detect a miss in the cache and to select the cache block from the plurality of cache blocks in response to detecting the miss.

11. The cache as recited in claim 10 further comprising a tag memory coupled to receive a second address from the interface and configured to output a plurality of tags corresponding to cache storage locations in the cache memory that are eligible to store a second cache block addressed by the second address, wherein the control circuit is configured to select a first cache storage location of the cache storage locations to store the second cache block if the second address is a miss in the cache, and wherein the address of the cache block comprises a first tag of the plurality of tags, the first tag corresponding to the first cache storage location.

12. The cache as recited in claim 11 further comprising a plurality of comparators, each of the plurality of comparators coupled to receive a respective one of the plurality of tags and a tag portion of the second address, and wherein the plurality of comparators are configured to compare the plurality of tags to the tag portion of the second address and are coupled to provide an indication of the comparison to the control circuit.

13. The cache as recited in claim 9 further comprising an input path for addresses received from the interface, wherein the same input path is used for the address of the cache block.

14. The cache as recited in claim 9 further comprising a data buffer coupled to the cache memory, wherein the data buffer is configured to store the cache block read from the memory for transmission on the interface.

15. The cache as recited in claim 9 wherein the address is part of a write transaction on the interface.

16. A method comprising:
    detecting a miss of in a cache;
    selecting a cache block for eviction responsive to the detecting;
    a cache transmitting an address of the cache block to be evicted from the cache on an interface responsive to the selecting;
    receiving the address in the cache; and in response to the receiving, reading the cache block from a data memory of the cache for transmission on the interface.

17. The method as recited in claim 16 further comprising transmitting the cache block on the interface.

18. The method as recited in claim 16 wherein the transmitting is part of a write transaction.

19. The method as recited in claim 16 further comprising storing the cache block in a data buffer responsive to the reading.

20. A cache comprising:
a cache memory configured to store a plurality of cache blocks; and
a circuit coupled to the cache memory, wherein the circuit is configured, responsive to a miss in the cache, to evict a first cache block of the plurality of cache blocks from the cache memory by causing a transmission of an address of the first cache block on an interface to which the cache is coupled;
wherein the cache memory is coupled to receive the address transmitted on the interface and is configured to read the first cache block responsive to receiving the address on the interface.

21. The cache as recited in claim 20 wherein the circuit is further configured to cause a transmission of the first cache block on the interface.

22. The cache as recited in claim 20 further comprising an input path for addresses received from the interface, wherein the same input path is used for the address of the first cache block.

23. The cache as recited in claim 20 further comprising a data buffer coupled to the cache memory, wherein the data buffer is configured to store the first cache block read from the memory for transmission on the interface.

24. The cache as recited in claim 20 wherein the address is part of a write transaction on the interface.

25. A carrier medium comprising a database which is operated upon by a program executable on a computer system, the program operating on the database to perform a portion of a process to fabricate an integrated circuit including circuitry described by the database, the circuitry described in the database including a cache comprising:
a cache memory configured to store a plurality of cache blocks; and
a circuit coupled to the cache memory, wherein the circuit is configured, responsive to a miss in the cache, to evict a first cache block of the plurality of cache blocks from the cache memory by causing a transmission of an address of the first cache block on an interface to which the cache is coupled;
wherein the cache memory is coupled to receive the address transmitted on the interface and is configured to read the first cache block responsive to receiving the address on the interface.

26. The carrier medium as recited in claim 25 wherein the circuit is further configured to cause a transmission of the first cache block on the interface.

27. The carrier medium as recited in claim 25 wherein the cache further comprises an input path for addresses received from the interface, wherein the same input path is used for the address of the first cache block.

28. The carrier medium as recited in claim 25 wherein the cache further comprises a data buffer coupled to the cache memory, wherein the data buffer is configured to store the first cache block read from the memory for transmission on the interface.

29. The carrier medium as recited in claim 25 wherein the address is part of a write transaction on the interface.

30. A carrier medium comprising a database which is operated upon by a program executable on a computer system, the program operating on the database to perform a portion of a process to fabricate an integrated circuit including circuitry described by the database, the circuitry described in the database including an apparatus comprising:
an interface; and
a cache coupled to the interface, wherein the cache is configured to transmit an address of a first cache block to be evicted from the cache on the interface, and wherein the cache includes a cache memory configured to store a plurality of cache blocks including the first cache block, the plurality of cache blocks being a capacity of the cache, and wherein the cache memory is coupled to receive the address from the interface, and wherein the cache memory is configured to access the first cache block in response to the address for transmission on the interface.

31. The carrier medium as recited in claim 30 wherein the cache is further configured to transmit the first cache block on the interface.

32. The carrier medium as recited in claim 30 wherein the cache includes an input path, and wherein a read address received from the interface traverses the input path to access the cache, and wherein the same input path is traversed by the address to access the first cache block.

33. The carrier medium as recited in claim 30 wherein the cache further comprises a tag memory coupled to receive a second address from the interface and configured to output a plurality of tags corresponding to cache storage locations in the cache memory that are eligible to store a second cache block addressed by the second address, wherein the cache is configured to select a first cache storage location of the cache storage locations to store the second cache block if the second address is a miss in the cache, and wherein the address of the cache block comprises a first tag of the plurality of tags, the first tag corresponding to the first cache storage location.

34. The carrier medium as recited in claim 33 wherein the cache further comprises a plurality of comparators, each of the plurality of comparators coupled to receive a respective one of the plurality of tags and a tag portion of the second address, and wherein the plurality of comparators are configured to compare the plurality of tags to the tag portion of the second address to detect the miss.

35. The carrier medium as recited in claim 30 wherein the cache further comprises a data buffer coupled to the memory, wherein the data buffer is configured to store the first cache block read from the memory for transmission on the interface.

36. The carrier medium as recited in claim 30 wherein the interface is a bus.

37. The carrier medium as recited in claim 30 wherein the cache is configured to transmit the address on the interface as a write transaction.

* * * * *

UNITED STATES PATENT AND TRADEMARK OFFICE
CERTIFICATE OF CORRECTION

PATENT NO.        : 6,697,918 B2                                    Page 1 of 1
APPLICATION NO.   : 09/909009
DATED             : February 24, 2004
INVENTOR(S)       : Joseph Rowlands It is certified that error appears in the above-identified patent and that said Letters Patent is hereby corrected as shown below:

Column 11, line 1: insert a paragraph indention before "Turning"

Column 11, line 9: insert a paragraph indention before "Generally"

Column 11, line 27: insert a paragraph indention before "While"

Column 11, line 33: insert a paragraph indention before "Numerous"

Signed and Sealed this

Eighteenth Day of November, 2008

JON W. DUDAS
*Director of the United States Patent and Trademark Office*